R. E. TROTTIER.
APPARATUS FOR CLASSIFYING AND CONCENTRATING ORES.
APPLICATION FILED AUG. 22, 1906.

981,230.

Patented Jan. 10, 1911.

3 SHEETS—SHEET 3.

UNITED STATES PATENT OFFICE.

RENÉ EMILE TROTTIER, OF HUSSEIN-DEY, FRANCE.

APPARATUS FOR CLASSIFYING AND CONCENTRATING ORES.

981,230. Specification of Letters Patent. Patented Jan. 10, 1911.

Application filed August 22, 1906. Serial No. 331,554.

*To all whom it may concern:*

Be it known that I, RENÉ EMILE TROTTIER, a citizen of the Republic of France, and resident of Hussein-Dey, Algeria, Republic of France, engineer, have invented a new and useful Apparatus for Classifying and Concentrating Ores, of which the following is a specification.

This invention relates to an apparatus designed for rapidly and economically classifying solid substances according to their linear dimensions and their specific gravity in moving water or air.

The apparatus consists of a vertical pipe comprising a number of identical superimposed sections traversed by a current of air or water under pressure. The more nearly the linear dimensions and the specific gravities of the substances are alike, the longer will be the pipe and the greater the number of sections. Each section consists essentially of a tube having within it a classifying table along which the current of water or air travels with a speed controlled by the position of an adjustable shoe. The material to be classified is introduced into one end of the pipe and encountering during its passage the current of classifying fluid flowing in the opposite direction, is classified automatically, first according to linear dimensions during its actual descent, then according to specific gravity under the influence of the classifying current in a passage of reduced section, and finally again according to linear dimensions along the classifying table. The separated material is carried away by a delivery chute and that on the classifying table falls into a lower section identical with that which precedes it, in which the same operations are repeated; and so on until the separation is complete the height of the sections, that is the height of the descent, allowing the separation by linear dimensions. If the number of sections is sufficient, a perfect classification of the substances treated may be attained. Each section comprises a very precise system of regulation, allowing an extremely sensitive classification, that is to say, the movable shoe for regulating the speed of the current, the classifying table whose inclination is variable to regulate the classification by specific gravity, the tubular distance pieces which allow the height of the descent to be varied for classifying by linear dimensions, and a vane to regulate the descent of the material.

Figure 1:
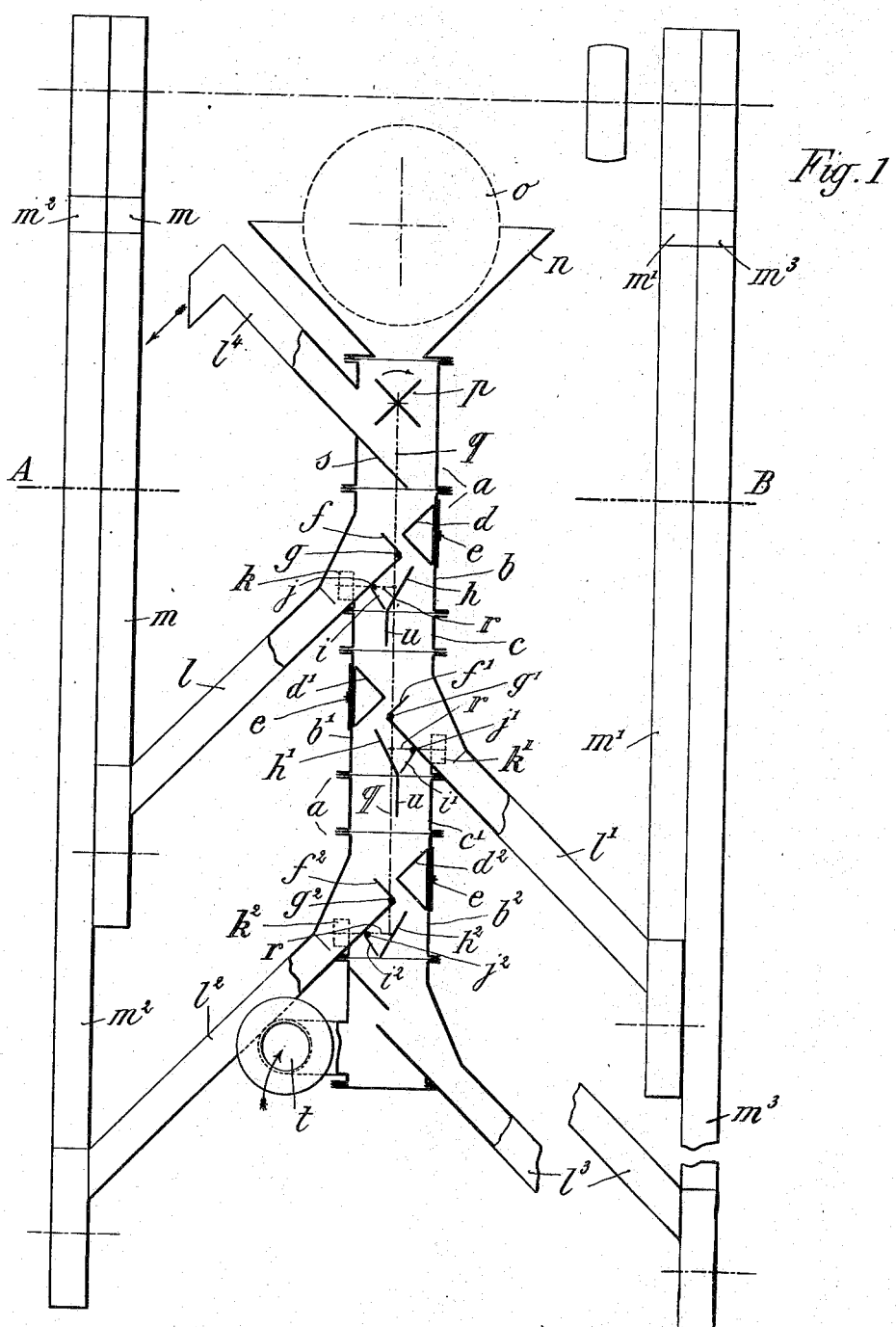
Figure 2:
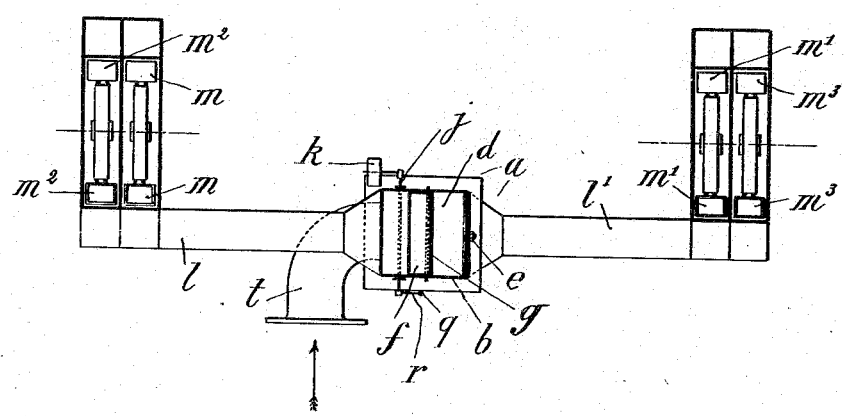
Figure 3:
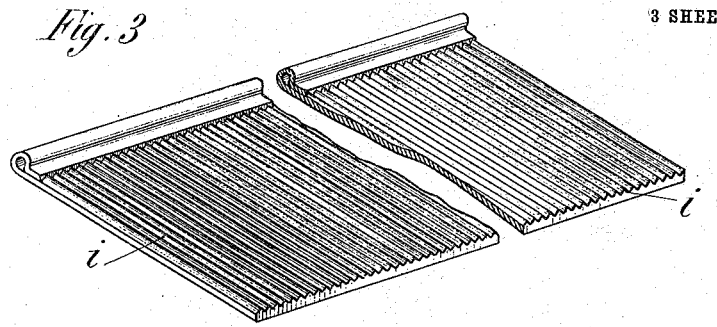
Figure 4:
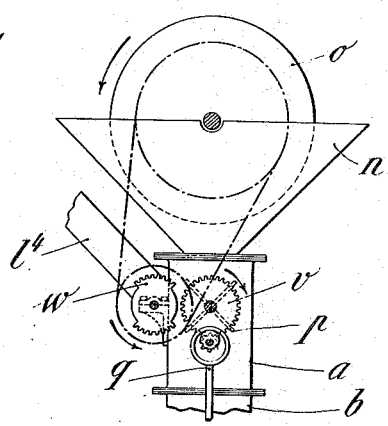
Figure 5:
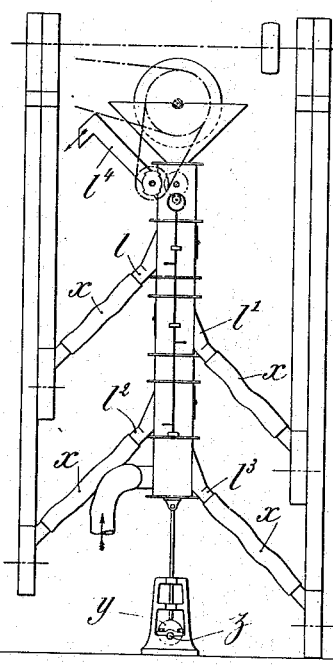

In the accompanying drawings Figure 1 is a diagrammatic vertical section of an apparatus according to this invention. Fig. 2 is a horizontal section on line A—B of Fig. 1. Fig. 3 is a perspective view of a sorting table with corrugated face. Fig. 4 is a front view in detail of the upper part of a modification of my apparatus showing the device which serves to actuate the distributer, and Fig. 5 is a complete view of the same on a smaller scale in which the chutes are shown as flexible for the purpose of permitting the whole tube to take a vertical oscillating movement.

The pipe $a$ is made up of a series of sections $b$ superimposed on each other in number suitable for the result to be obtained. Each of these sections, in this instance three $b\ b^1\ b^2$, consists of a tube of square or rectangular cross section having flanged ends. The width of the cross section depends on the volume of material to be treated, while the length depends on the quantity. The height of the tube depends on the difficulty attending the separation of the various substances treated, and therefore on the linear dimensions and the specific gravity of these substances. The effective height of the tube may be simply varied by interposing between two tubes corresponding tubular distance pieces $c\ c^1$. The internal surfaces of the sections $b\ b^1\ b^2$ are dressed and one surface carries a regulating shoe $d\ d^1\ d^2$, which can be moved vertically and fixed in the desired position by a bolt $e$. The function of the shoes is to regulate the speed of the current of water or air along the sorting tables $f,\ f^1\ f^2$ which may be corrugated or smooth and are hinged on the pins $g\ g^1\ g^2$ so that their inclination may be varied according to the difference of specific gravity of the substances treated and the degree of classification desired. Guides $h\ h^1\ h^2$ direct the material against vanes $i\ i^1\ i^2$, which turn on pins $j\ j^1\ j^2$, and are constantly held against the lower ends of the guides $h,\ h^1\ h^2$ by counterweights $k\ k^1\ k^2$ arranged outside the tube. Chutes $l\ l^1\ l^2$ conduct the classified material to the corresponding elevators $m\ m^1\ m^2$.

At the upper part of the apparatus a cylindrical sieve $o$ revolving in a hopper $n$ feeds the material to be treated on to a wheel $p$ carrying troughs and turned through a quarter revolution at regular intervals of time by a device which also moves up and down the rod $q$ at each movement of the wheel $p$. The device which serves to actuate the wheel $p$ can advantageously be constituted by a gear wheel $v$ carried by the shaft of the wheel $p$ and gearing with a mutilated gear wheel $w$ actuated directly or not by a motor shaft which can be, for example, that of the rotary sieve $o$, (see Fig. 4). The rod causes the vanes $i\ i^1\ i^2$ to move up and down through lever arms $r$ attached at one end to the rod and at the other to the vane, or to its pivot, on the side opposite that on which the counterweight is attached. The topmost section also carries a guide $s$ and a delivery chute $l^4$, the lowest section has a chute $l^3$ leading to an elevator $m^3$ and is in communication with a pipe $t$ for admitting air or water under pressure. The working of the apparatus may be regulated by the adjustment of the fluid admission at $t$ and by the admission of the material to be classified at $o$.

The operation of the apparatus is as follows:—Supposing that water is the classifying fluid and that the current is upward, the cock that controls the pipe $t$ is opened and as soon as water flows from the chute $l^4$ the material to be treated, such as an ore, is introduced through $o$. The wheel $p$ is alternately filled and emptied, and its contents, classifying themselves according to their linear dimensions during their descent, travel through the ascending current of liquid which carries the lightest substances through the chute $l^4$. The heavier substances slide on the upper surface of the shoe $d$ and fall into the current which passes along the lower surface thereof; but once they enter between the shoe and the table $f$ their classification is effected solely by specific gravity. The material driven back is carried against the sorting table $f$ and subjected to the influence of the speed of the current, so that a new classification according to linear dimensions is produced. The densest grains collect against the vane $i$, then these classified by linear dimensions on the table $f$, in their order of classification; these operations are the more easily effected in that a classification by linear dimensions has already occurred before the passage in front of the shoe $d$. The substances stopped by the vane, descend as soon as this is lowered and are similarly separated in the next lower section $b^1$ where an analogous action occurs. In proportion as the material descends its classification is accentuated for the height of fall increases and the materials present, according to their specific gravities, increasing spaces for the action of the current. It is advisable to use a separating septum $u$ in order to avoid carrying up the material by the ascending current when it ought to be descending. The apparatus is so regulated that pure substances alone arrive at the chute $l^3$.

The elevators $m\ m^1\ m^2\ m^3$ lift the material from the corresponding chute above the water and deliver it outside the apparatus; instead of using elevators, each chute may deliver its product into a tight receiver which may be emptied when full. All this ought to occur in water and no secondary current should be produced by these chutes, unless there are large quantities of water to be disposed of and the material of the chutes must be more or less violently carried along. In any case, the derived currents should not disturb the ascending current, or rather the principal current for the apparatus can operate equally well with a descending current.

When material which is very fine and adherent is to be treated the chutes are made sufficiently flexible to allow a vertical vibratory movement to be given to the classifying pipe. Accordingly, part of the evacuation conduits or chutes can be constituted by the sleeves $x$, of leather or cloth, and an oscillatory movement can be given to the whole tube by an eccentric $y$ mounted on a lower shaft $z$, see Fig. 5. This arrangement serves particularly well when air is used as the distributing current.

The present apparatus utilizes methodically the characteristic function of a substance, namely its weight and its volume, whence are derived its specific gravity and the uniform speed which it very rapidly assumes when it descends in a fluid presenting more or less resistance. Owing to the arrangement whereby these different qualities are influenced by this apparatus it is possible to vary infinitely the classification and the separation, for example to prevent absolutely such and such a substance from passing such and such a chute, to allow it to pass such and such other chute, all with great precision. Thus specific gravities only differing by some hundredths can be separated. In fact one can influence with the greatest ease on the one hand the classification by linear dimensions by modifying the height of the sections, that is to say by varying the distance pieces, and on the other hand the classification by specific gravity by varying the inclination of the tables and the position of the regulating shoes.

The present apparatus is distinguished in particular by the following advantages; a low initial cost owing to the similarity of all the parts, a very small weight and volume, a high degree of precision and efficiency, a low cost for power, and finally great purity and regularity of products.

Further advantages are that there is an inappreciable loss of useful material, that the apparatus is able to treat equally well large grain and the finest dust, for the latter of which air may advantageously be substituted for water, and that the apparatus can be mounted in series and worked automatically. In fact the apparatus permits successful treatment and classification of all solid substances, the poorest as well as the most complex, notably poor auriferous sands.

The number and the cross section of the tubular sections may be varied according to the nature and quantity of the substances treated, but their height depends essentially on the degree of separation which is to be attained; the number of three sections has been given merely as an example.

Having thus fully described my invention, what I claim as new, and desire to secure by Letters Patent is:

1. In an apparatus for classifying and concentrating solid materials, a plurality of slanting classifying tables interconnected by a vertical passage, whereby the materials may have a complete classification by their linear dimensions intermediate their classification by specific gravity, an intermittently rotating wheel for supplying the materials to the apparatus, and swinging vanes under the control of the said wheel for regulating the passage of the materials from one classifying table to the next.

2. In an apparatus for classifying and concentrating solid materials, the combination of tubular elements for classification by specific gravity, inclined classifying tables disposed in the said elements, open tubular portions located between the elements for classification by specific gravity and adapted for classification according to linear dimensions, chutes connected with each of the first named elements for the escape of the classified materials, means for passing a fluid current throughout the apparatus, and adjustable means coöperating with the said classifying tables for regulating the direction and force of the current.

3. In an apparatus for classifying and concentrating solid materials, the combination of tubular elements for classification according to specific gravity, open tubular portions between these elements, means for passing a current throughout the apparatus, inclined adjustable classifying tables, fixed guides, vertically adjustable shoes, and chutes connected with each of the first named elements for the escape of the classified material.

4. In an apparatus for classifying and concentrating solid materials, the combination of tubular elements for the classification by specific gravity, open tubular portions between these elements, means for passing a current throughout the apparatus, adjustable classifying tables, fixed guides, shoes adjustable toward and away from the classifying tables, swinging vanes for regulating the quantity of material passing through the apparatus, and chutes connected with each of the first named elements for the escape of the classified material.

5. In an apparatus for classifying and concentrating solid materials, the combination of tubular elements for classification according to specific gravtiy, open tubular portions between these elements, means for passing a liquid current throughout the apparatus, adjustable classifying tables and adjustable shoes located in said elements, chutes connected with each of the first named elements for the escape of the classified material, a rotatable sieve adapted to dip in the liquid current and also adapted to receive the material to be classified, and an intermittently rotating wheel adapted to receive the material from the sieve and dispense it in the classifying apparatus.

6. In an apparatus for classifying and concentrating solid materials, the combination of tubular elements for the classification according to specific gravity, open tubular portions between these elements, means for passing a liquid current throughout the apparatus, adjustable classifying tables and adjustable shoes located in said elements, vanes for adjusting the quantity of material passing through the apparatus, chutes connected to each of the first named elements for the escape of the classified material, a rotatable sieve adapted to dip in the liquid and also adapted to receive the material to be classified, an intermittently rotating wheel adapted to receive the material from the sieve and dispense it in the classifying apparatus, and means connecting the said intermittently rotating wheel and the said vanes.

7. In an apparatus for classifying and concentrating solid materials, the combination of tubular elements for classification according to specific gravity, open tubular portions between these elements, means for passing a liquid current throughout the apparatus, adjustable classifying tables and adjustable shoes located in the said elements, adjustable vanes for regulating the quantity of material passing through the apparatus, an intermittently rotating distributer controlling the opening of said vanes, chutes connected with each of the first named elements for the escape of the classified material, and elevators for removing the classified material, the said apparatus being provided with an independent orifice for the escape of the classifying current.

8. In an apparatus for classifying and concentrating solid materials, the combination of tubular classifying elements, adjustable classifying tables and adjustable shoes located in said elements, open tubular portions between said elements, chutes connected with each of the said first named elements for the escape of the classified material, means for passing a fluid current throughout the apparatus, and means for oscillating the apparatus in order to facilitate the passing of fine and sticky material.

In testimony, that I claim the foregoing as my invention, I have signed my name in presence of two witnesses, this sixth day of August 1906.

RENÉ EMILE TROTTIER.

Witnesses:
JEAN ANDRÉ MESSAGE,
LUCIEN CARTIGUE.